United States Patent
Chen et al.

(10) Patent No.: US 6,625,590 B1
(45) Date of Patent: Sep. 23, 2003

(54) COMMAND LINE INTERFACE FOR REDUCING USER INPUT IN A NETWORK MANAGEMENT DEVICE

(75) Inventors: David De-Hui Chen, Cary, NC (US); Michael Frederick Gering, Hillsborough, NC (US); Stephen Anton Owen, Raleigh, NC (US); Allen Lewis Springer, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/371,446

(22) Filed: Aug. 10, 1999

(51) Int. Cl.[7] .............................. G06F 17/30; G06F 7/00
(52) U.S. Cl. ........................... 707/1; 709/223; 709/320; 709/328; 345/740; 345/966
(58) Field of Search .............. 707/1, 100; 709/217–219, 709/223–226, 320, 328; 713/200–202; 345/740, 966

(56) References Cited

U.S. PATENT DOCUMENTS

| | | | | |
|---|---|---|---|---|
| 4,591,967 A | * | 5/1986 | Mattes et al. ................... 700/3 |
| 4,648,062 A | * | 3/1987 | Johnson et al. ............. 345/708 |
| 4,839,640 A | * | 6/1989 | Ozer et al. ................. 340/5.33 |
| 5,239,617 A | * | 8/1993 | Gardner et al. ................ 706/11 |
| 5,255,386 A | * | 10/1993 | Prager ........................... 707/5 |
| 5,313,598 A | * | 5/1994 | Yamakawa ..................... 707/1 |
| 5,369,575 A | * | 11/1994 | Lamberti et al. ............... 704/9 |
| 5,377,103 A | * | 12/1994 | Lamberti et al. ............... 704/9 |
| 5,664,173 A | * | 9/1997 | Fast ................................. 707/4 |
| 5,678,045 A | * | 10/1997 | Bettels ........................ 707/200 |
| 5,812,825 A | * | 9/1998 | Ueda et al. .................... 703/23 |
| 5,898,825 A | * | 4/1999 | Eberhard ........................ 714/2 |
| 5,898,835 A | * | 4/1999 | Truong ....................... 709/217 |
| 6,070,244 A | * | 5/2000 | Orchier et al. ............... 713/201 |
| 6,108,309 A | * | 8/2000 | Cohoe et al. ................ 370/241 |
| 6,151,609 A | * | 11/2000 | Truong ....................... 707/505 |

OTHER PUBLICATIONS

Darragh, J.J., I.H. Witten and M.L. James "The Reactive Keyboard: A Predictive Typing Aid", IEEE Computer, vol. 23, No. 11, pp. 41–49, Nov. 1990.*

Yoshida, K. "User Command Prediction by Graph–Based Induction", Proceedings of the 6th International Conference on Tools with Artificial Intelligence, pp. 732–735, Nov. 6–9, 1994.*

(List continued on next page.)

Primary Examiner—Srirama Channavajjala
Assistant Examiner—Luke S. Wassum
(74) Attorney, Agent, or Firm—Gerald R. Woods; Bracewell & Patterson, LLP

(57) ABSTRACT

A command line interface for a network management platform includes a parser that parses and validates inputs entered at a command line, a command processor that, responsive to validation of a command, causes an operation specified by the command to be performed, and an output facility that presents outputs of the command line interface. The parser preferably enforces a syntax addressing a plurality of attributes of a network device as a tree-like hierarchy including at least two containers. The parser permits network device attributes, which are each contained in at least one container, to be contained by multiple containers of the same type so that such attributes are addressable via a plurality of different access paths. The output facility preferably provides one or more outputs for operations specified by processed input commands, and the one or more outputs preferably include at least one output command specifying a network management operation to be performed. To facilitate entry of valid inputs, the command line interface may be further equipped with an input assistance facility that causes the output facility to present, for a selected network device in the communication network, a prompt for each of a plurality of attribute names that specifies possible attribute values for the plurality of attribute names.

18 Claims, 7 Drawing Sheets

OTHER PUBLICATIONS

Cisco Cisco IOS Release 11.1 Configuration Fundamentals Configuration Guide, pp. 1–11, 1–58, Mar. 4, 1996.*

Hirsh, H. and B.D. Davison "An Adaptive UNIX Command– Line Assistant", Proceedings of the 1$^{st}$ International Conference on Autonomous Agents (AGENTS 97), 1997.*

Davison, B.D. and H. Hirsh, "Toward An Adaptive Command Line Interface", Proceedings of the 7$^{th}$ International Conference o Human–Computer Interaction, 1997.*

Davison, B.D. and H. Hirsh, Proceedings of the AAAI Spring Symposium on Intelligent Environments, 1998.*

Sybase, System Administration Guide for Sybase SQL Server, Sybase SQL Server Release 4.9.1, 1992, pp. 11–14 and 11–15. QA76.9.D3 S94 v.3.*

Sybase, "Commands Reference Manual for Sybase SQL Server for UNIX", Sybase SQL Server Release 4.9.1, 1992, p. 2–311. QA76.9.D3 S94 v.1.*

Hoffman, P. and Nicoloff, T. "MS_DOS User's Guide", Berkeley:Osborn/McGraww–Hill, 1984, pp. 19–21. QA76.76.O63.H6 1984.*

Sybase, "System Administration Guide for SYBASE SQL Server," SYBASE SQL Server Release 4.9.1, 1992, pp. 11–14 and 11–15. QA76.9.D3 S94 v.3.*

Sybase, "Transact–SQL User's Guide for SYBASE SQL Server", SYBASE SQL Server Release 4.9.1, 1992, pp. 2–1 through 2–7 and 11–1 through 11–5. QA76.9.D3 S94 v.2.*

Sybase, "Commands Reference Manual for SYBASE SQL Server for UNIX", SYBASE SQL Server Release 4.9.1, 1992, p. 2–311. QA76.9.D3 S94 v.1.*

Wolz, U. and Kaiser, G.E. "A Discourse–Based Consultant for Interactive Environments", Proceedings of the 4$^{th}$ Conference on Artificial Intelligence for Applications, Mar. 14–18, 1988, pp. 28–33.*

Lee, W. "?": A Context–Sensitive Help System based on Hypertext, Proceedings of the 24$^{th}$ Annual ACM/IEEE Conference on Design Automation, Oct. 1987, pp. 429–435.*

Cisco Systems, "Product Bulletin No. 367, Cisco IOS Software Release Dates & Milestones", Dec. 3, 2001.*

Cisco Systems, "Cisco IOS Release 11.1 Configuration Fundamentals Configuration Guide", pp. I–11 through I–58, Mar. 4, 1996.*

Cisco Systems, "Cisco IOS Release 11.1 Configuration Fundamentals Command Reference", pp. I–63 through I–94 and I–181–190, Mar. 4, 1996.*

Sybase, "System Administration Guide for SYBASE SQL Server", SYBASE SQL Server Release 4.9.1, 1992, pp. 11–14 and 1 15. QA76.9.D3 S94 v.3.*

Sybase, "Transact–SQL User's Guide for Sybase SQL Server", SYBASE SQL Server Release 4.9.1, 1992, pp. 2–1 through 2–7 and 11–1 through 11–5. QA76.9.D3 S94 v.2.*

Sybase, "Commands Reference Manual for SYBASE SQL Server for UNIX", SYBASE SQL Server Release 4.9.1, 1992, p. 2–311. QA76.9.D3 S94 v.1.*

Hayes, "Fax/Data Modem User's Manual", Publication No. ASK9406, 1995, pp. 1–4 and 6.*

Cisco Systems, "Cisco IOS Release 11.1 Configuration Fundamentals Configuration Guide", Mar. 4, 1996, pp. I–11 through I–58.*

* cited by examiner

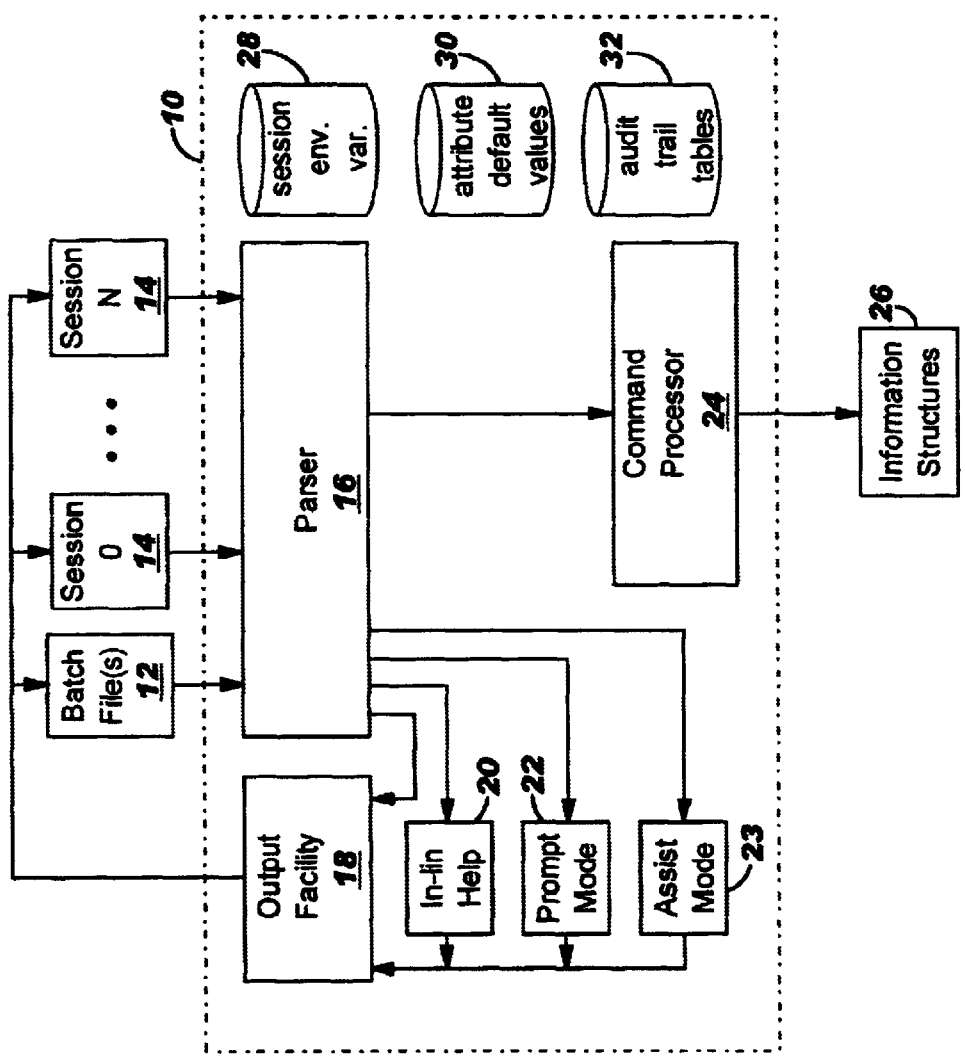

COMMAND LINE INTERFACE FOR REDUCING USER INPUT IN A NETWORK MANAGEMENT DEVICE

CROSS-REFERENCE TO RELATED APPLICATION

This application is related to U.S. application Ser. No. 09/371,447 (RA9-99-003), which is entitled "Command Line Interface for a Data Processing System" and is filed on even date herewith.

BACKGROUND OF THE INVENTION

1. Technical Field

The present invention relates in general to networking and, in particular, to network management. Still more particularly, the present invention relates to a command line interface for a network management platform.

2. Description of the Related Art

Data communication networks and network management platforms are well known in the art. In an effort to provide more graphical and intuitive management of data communication networks, many network management platforms have adopted menu or icon-based interfaces. Menu-based interfaces generally permit an operator to control particular network devices (e.g., computers, routers, bridges, and servers) by navigating through a series of linked menu screens and entering appropriate commands and parameter values. Icon-based interfaces, on the other hand, typically permit the operator to set parameters through dialog boxes or the like and to enter commands through the manipulation of graphical objects.

While such network management platform interfaces may provide easily-navigable and intuitive interfaces, a large amount of operator input can be required to perform conventional management functions for just one network device. Thus, the "user-friendly" characteristics that make menu and icon-based interfaces more accessible to inexperienced operators may actually hamper more experienced operators and do not easily lend themselves to automation, bundling of commands, script processing, and cut-and-paste editing operations.

SUMMARY OF THE INVENTION

The present invention addresses the above and other shortcomings in the art by providing United Command Interface (UCI), a command line and batch file interface for a network management platform.

In accordance with the present invention, UCI provides a command line interface for a network management platform including a parser that parses and validates inputs entered at a command line, a command processor that, responsive to validation of a command, causes an operation specified by the command to be performed, and an output facility that presents outputs of the command line interface. The parser preferably enforces a syntax addressing a plurality of attributes of a network device as a tree-like hierarchy including at least two containers. The parser permits network device attributes, which are each contained in at least one container, to be contained by multiple containers of the same type so that such attributes are addressable via a plurality of different access paths. The output facility preferably provides one or more outputs for operations specified by processed input commands, and the one or more outputs preferably include at least one output command specifying a network management operation to be performed. To facilitate entry of valid inputs, the command line interface may be further equipped with an input assistance facility that causes the output facility to present, for a selected network device in the communication network, a prompt for each of a plurality of attribute names that specifies possible attribute values for the plurality of attribute names.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1B illustrates an exemplary information hierarchy in accordance with the present invention;

DETAILED DESCRIPTION OF ILLUSTRATIVE EMBODIMENT

UCI Overview

The Unified Command Interface (UCI) is a concise command interface for a network management platform that can be utilized to create, update, retrieve, and store network management information in network devices. Because UCI is an interface rather than a network management platform, UCI is not restricted to use with a particular set of underlying network management platforms and communication protocols that actually enact UCI directives. Rather, UCI is applicable to any network management platform, network hardware, and communication protocol that supports the functionality and definitions described below.

UCI is designed to permit both ASCII and National Language Support (NLS) inputs and can operate in both a command line mode (i.e., interactive) and a batch file mode. UCI provides the ability to create configuration and command scripts for editing, reuse, and execution or application to more than one network device.

Figure 1A:
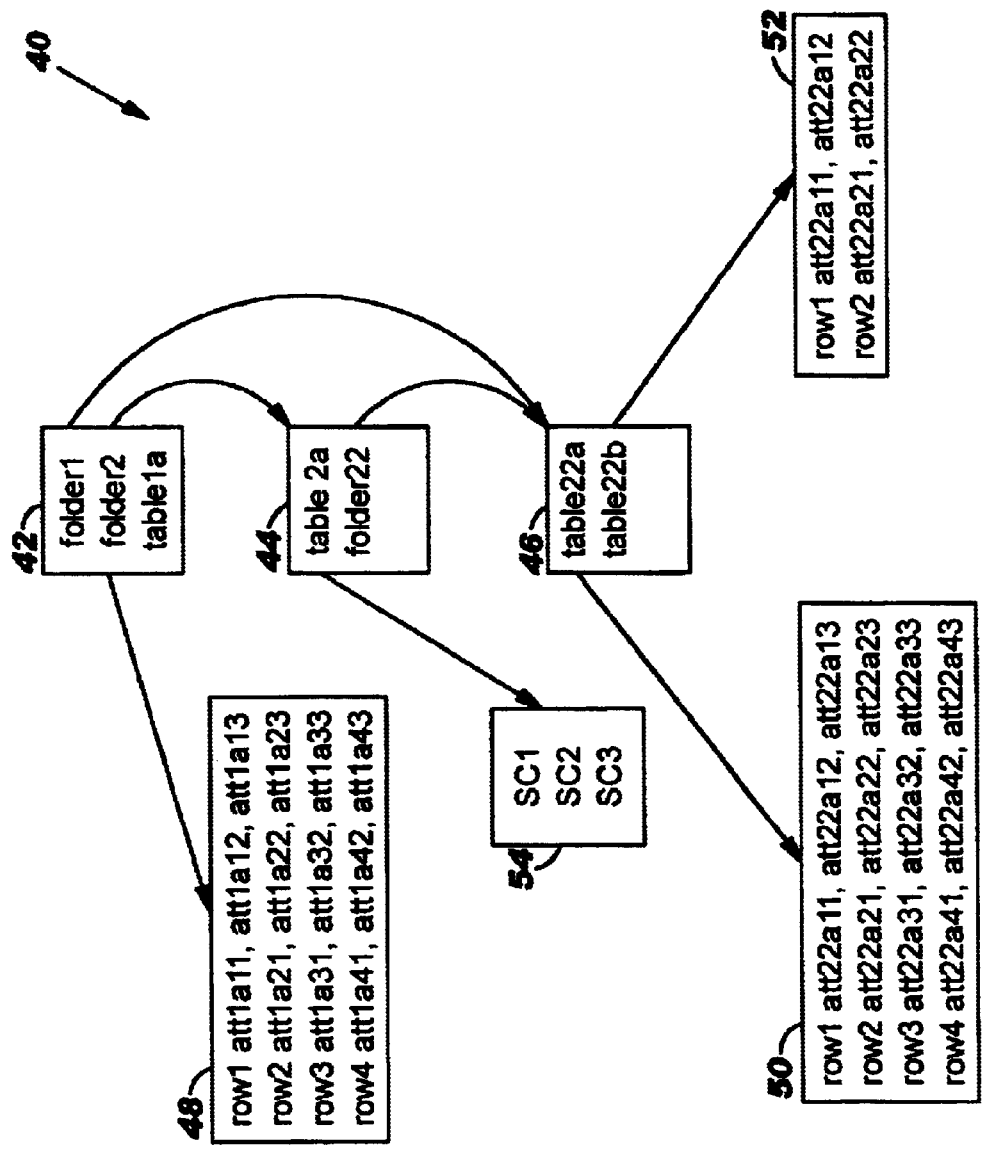
FIG. 1A is a high level block diagram of a Unified Command Interface (UCI) in accordance with a preferred embodiment of the present invention.

With reference now to the figures and in particular with reference to FIG. 1A, there is depicted a high level block diagram of a preferred embodiment of a UCI in accordance with the present invention. As shown, UCI 10 can receive inputs from and provide outputs to both batch files 12 and one or more concurrent interactive sessions 14. The inputs received by UCI 10 are processed by a parser 16 that parses and validates the syntax of inputs and provides outputs to batch files 12 and sessions 14 via an output facility 18. As shown, UCI 10 also includes an in-line help facility 20, a prompt mode facility 22, and an assist mode facility 23 that employ output facility 18 to provide an operator with assistance in entering proper inputs. UCI 10 further includes command processor 24, which, following entry of an execution point, executes UCI commands validated by parser 16 through accesses to UCI information structures 26. Finally, UCI 10 includes session environment variables 28 that govern the operation of UCI 10 in the various sessions 14, attribute default values 30 that are employed by assist mode facility 23 to provide an operator with suggested or default input values (as discussed further below), and audit trail tables 32 that log the execution and commitment of certain UCI commands.

UCI Information Structures

UCI specifies generic and flexible information structures that organize network information for both static configuration and runtime operations of network devices. UCI introduces two organizing structures, folders and tables, which form containers for network management information and which can arranged in a hierarchical fashion. The following definitions are relevant to UCI information structures:

folder:=a container of one or more other containers, which other containers can include folders, tables, or scalar (single instance) tables;

table:=a container of a collection of one or more related leaf objects, where each table row corresponds to a leaf object and each table column corresponds to an attribute of a leaf object;

leaf object:=an object instance containing at least one attribute that an operator can create, configure, retrieve, and use to perform operations;

row (instance) name:=a user-assigned name that uniquely identifies a leaf object within a table; and attribute:=the name of a data element (attribute value) describing the characteristics of a leaf object.

By creating containment relationships and associations between folders, tables, leaf objects, and attributes, a tree-like information hierarchy representing a unique binding of all network management information in a network device's database (e.g., Management Information Block (MIB)) can be constructed. Importantly, there is no limit to the number of tables supported for the network management configuration or realtime operational functions of each network device, but each table must be uniquely identified (e.g., by a unique logical name) at least among the tables sharing a common access path. UCI also permits each component of an information hierarchy to have multiple containment relationships (e.g., a leaf object can be grouped in different tables and a table can be contained in multiple folders), making it possible to access the same attribute via multiple different paths.

Another feature of UCI is the ability to group single instance data elements (i.e., scalars) that occur only once in a network management database to be grouped in scalar tables as if the scalars were related leaf objects in a table structure. This facilitates operational interaction with multiple scalar elements.

An example of an exemplary information hierarchy representing the network management database of a network device is shown in FIG. 1B. As illustrated, information hierarchy 40 is logically arranged in a tree-like data structure including folders 42–46 and tables 48–54. Folder 42, which in this case is a root folder, contains folder 46, folder 44, and table 48, which are associated with the logical names folder1, folder2 and table1a, respectively. Folder 44 in turn contains table2a 54, which is a scalar table containing scalars sc1, sc2 and sc3, and folder 46, which is associated with the logical name folder22. Thus, as shown in FIG. 1B, folder 46 can be accessed by multiple paths (and multiple logical names).

Each of tables 48–52 includes a number of leaf objects that each have a user assigned instance name such as row1, row2, etc. Each leaf object (i.e., row) contains a number of attributes (e.g., att1a11, att1a12, etc.) that each have an associated attribute value.

The illustrated tree-like information hierarchies employed by UCI permit several different methods of organizing information according to the specific data element requirements of a networking protocol or network device setup. UCI therefore formalizes an access mechanism to attributes within the information tree in accordance with the requirements of each network, system, or configuration management activity.

UCI Command Set

UCI specifies a set of verbs, called operational directives, that specify the operations that can be performed on information structures and attributes in the static configuration and realtime operation of network devices. Since attributes are stored in a defined database schema, the operational directives themselves do not need to be tailored to specific operations or specific network devices as in conventional command interfaces. Instead, the objects to which an operational directive applies are determined by the operational scope. Therefore, a operator unfamiliar with UCI has only a small number of operational directives to learn.

The operational directives defined by UCI and recognized by parser 16 include the following:

| | |
|---|---|
| SET:= | updates attributes or performs action with the values assigned for the operational scope. Set will create a leaf object if the specified object instance does not exist in the indicated table. |
| CREATE:= | creates a leaf object or performs action with the specified attributes and values only if the specified object instance does not exist in the indicated table; |
| UPDATE:= | updates attributes or performs action with the values assigned for the scope only if the specified object instance already exists in the indicated table; |
| DELETE:= | removes leaf object(s) from the table(s) defined by the operational scope; |
| LIST:= | presents contents of folders, tables, rows and attribute values and attribute characteristics specified by the operational scope and other optional inputs; |
| HELP:= | presents information on the permitted syntax, operational scope, and default value; |
| DUMP:= | writes a complete copy of all of the tables, table rows, and attribute values for a specified operational scope, and if no operational scope is specified, the complete database for the operational context, to a specified network location (e.g., a remote file server); |
| EXTRACT:= | retrieves an information structure for an operational context from a file server; |
| EXIT:= | terminates all sessions and returns to local or remote operation console; |

-continued

| | |
|---|---|
| UCI:= | enters a new session defined by the environment variables of the current session; and |
| RETURN:= | closes only the current session. |

The DUMP and LIST operational directives cause all or selected portions of a network device's information hierarchy to be extracted in a line or file format and stored for editing (e.g., using a simple ASCII editor). This allows the use of cut and paste functions to produce cookie-cutter operations for the configuration and realtime management of network devices. Furthermore, the DUMP and LIST operational directives permit network utility scripts to be written to deploy these extracted and possibly updated UCI scripts to many network devices and thereby enables network configuration and management operations to be automated.

UCI Command Syntax

UCI syntax relies on the definition and arrangement of network management information in a regular and formal notation. UCI command syntax for both command line and file modes includes up to three fields arranged as follows:

[operational directive] [operational scope] [operational target(s) or operational parameter(s)]

The operational scope defines the objects to which the operational directive applies. The operational scope can be as specific as a single leaf object but can also include larger collections of objects, such as folders or tables. The operational scope is given by a fully qualified name formed of an ordered sequence of delimited folder, table, scalar table, and/or instance logical names indicating a valid path from the root of an information hierarchy. An example of an operational scope can be expressed as:

/FolderName/TableName/RowName, where "/" is used as the delimiter and the first occurrence of "/" indicates the root container of the information hierarchy.

Importantly, the operational directive and operational scopes are independently persistent, meaning that the operational directive and operational scope are independently carried between UCI commands unless changed. Table I below illustrates various scope designations that may be employed to change the current operational scope. An operator's use of "../" in a UCI command specifies one level up in the information hierarchy from the current operational scope.

TABLE I

| current operational scope | operational scope designated in UCI command | resulting operational scope |
|---|---|---|
| /f1/f2/ | /f3/f4/ | /f3/f4/ |
| /f1/f2/ | f5/t1 | /f1/f2/f5/t1 |
| /f1/f2/f6/ | ../../f7/f8 | /f1/f7/f8/ |
| /f1/f2/t3/2.1.2 | ../9.6.1 | /f1/f2/t3/9.6.1 |

The operational target(s) or operational parameter(s) are defined as the particular leaf objects and/or attributes and attribute values within the scope to be operated upon by the operational directive. Thus, examples of valid UCI commands are as follows:

set /FolderName/TableName/RowName a1=value
list /FolderName/TableName/RowName a1 a2 a3 where a1, a2, and a3 are attribute names.

A command line input received by UCI is parsed by parser 16 from left to right at a validation point (e.g., when Line Feed or Enter is received). Depending upon the UCI command, the validation point may also be an execution point at which the operational directive is performed. However, in many instances, an explicit execution point designator (e.g., ";") or implicit execution point designator (e.g., an operational directive or change in operational scope) is required. Table II summarizes preferred UCI parsing behavior for several operational directives in response to whether the operational scope and operational directive remain the same as in the previous UCI command. In Table II, "X" means that the operational directive is to be executed, and "delay" signifies that the UCI command is parsed for correctness as it is entered, but no command processing is performed or committed until an implicit or explicit execution point designator is entered and parsed. Importantly, the HELP and UCI operational directives do not serve as implicit execution point designators, thus permitting an operator to obtain help or initiate a new session without committing a partially entered UCI command.

TABLE II

| op. dir. | ";" | same op. dir. | diff. op. dir. | same op. scope | diff. op. scope | "Enter" |
|---|---|---|---|---|---|---|
| set create update | X | delay | X | delay | X | delay |
| list help | X | ignore | X | ignore | delay | X |

The implementation of distinct validation and execution points permits multiple UCI commands to be entered on a single command line. Supporting different validation and execution points also permits several lines of UCI command input to be entered before an action will be committed, thereby creating an atomic unit of work that spans multiple lines of operator input.

To assist the operator in entering a valid UCI command, UCI supports an in-line help feature (implemented by in-line help facility 20 of FIG. 1A). The operator accesses the in-line help feature simply by typing a "?" (or other designated character) at any location in a UCI command line and pressing Enter or Line Feed. UCI responds by displaying valid inputs that may be entered following the location of the "?" in the UCI command line. For example, if the operator simply types "?" at the UCI prompt and then presses Enter, UCI will display a list of all operational directives. If a portion of an operational directive is typed prior to the "?" (e.g., "up?"), UCI's in-line help feature would display the entire operational directive (e.g., update). As another example, if the operator enters "list /f1/f2/abcd?", UCI preferably displays a response below the command line input by the operator as follows:

list /f1/f2/abcd?
    abcdef/abcde/abcd abcdxyz list /f1/f2/abcd_ where boldface type designates UCI output, "_" indicates the cursor position at which the operator can continue providing input, and a "/" following a displayed choice indicates that the choice does not form a complete operational scope. In an alternative embodiment, one of the choices can be displayed completing the command line, and all the available choices can be toggled through, for example, by hitting the Tab key.

If the operator has typed an incorrect input, UCI will display valid inputs following the point in the command at which the error occurs. For example, if the operator enters "list /f1/t2/abxd" with or without a terminating "?", UCI provides the following output (again shown in boldface type):

list /f1/f2/abxd?
  ô invalid character—correct choices are:
    abcdef/ abcde/ abcd abcdxyz
list /f1/f2/ab_

If the operator enters a "?" following a partial command including a valid sequence of folders terminating with a "/", then UCI provides a list of tables contained by the folder. An example is given below.

list /f1/f2/abcd/?
  table1/ table2/ table 3 table4/
list /f1/f2/abcd/_

In the above example, table1, table2 and table4 are non-scalar tables, and table 3 is a scalar table, as indicated by the fact that a "/" does not terminate the table name. UCI similarly displays a list of row names if a "?" is entered following a partial LIST command ending with a table name terminated by a "/" and displays a list of attributes (i.e., column names) if a "?" is entered following a partial LIST command ending with a completed scalar table name or row name. If the full scope of a command including an attribute name has been entered, UCI displays an "=", indicating than an attribute assignment is possible, or if the partial command already includes a "=", default, current, and/or permissible ranges of attribute values are displayed.

It is important to note that UCI provides in-line help for operational directives other than LIST. For CREATE, the syntax of folders, tables, or row names can be displayed, depending upon where in the command the "?" appears. For a partial UPDATE command terminating with a valid table name and "/", the current row names are displayed. If no rows are yet established, an error message is displayed along with the choices SET and CREATE.

As indicated in the above examples, UCI command outputs, whether generated by the in-line help feature or otherwise, are preferably formatted as valid UCI command inputs. In this manner, UCI reduces the operator keystrokes required to perform many functions since the operator can utilize conventional cut and paste features in the UCI interface to create new UCI commands suitable for other accessing other objects in the same information hierarchy or the information hierarchies of other network devices.

UCI Operational Model

Figure 2:
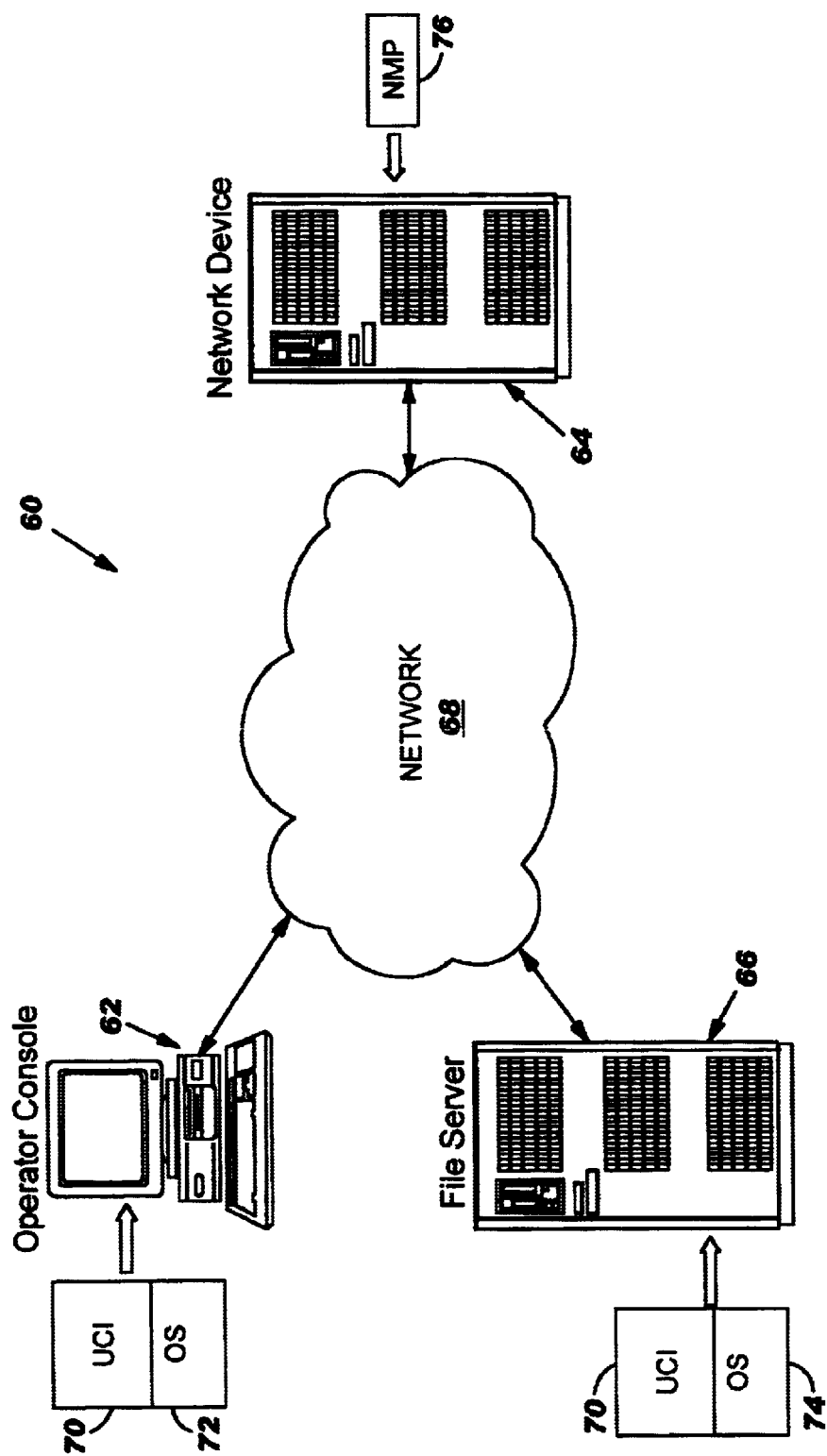
FIG. 2 depicts an illustrative embodiment of a network environment with which the method and system of the present invention may advantageously be utilized.

Referring now to FIG. 2, there is depicted an illustrative embodiment of a network environment in which UCI can advantageously be utilized. As illustrated, network environment 60 includes a network 68 and an operator console 62, coupled to network 68, from which an operator (e.g., a network administrator) can monitor and manage the operation of network devices, such as network device 64, that are coupled to network 68. Network 68 can have any topology and can include both public data networks (e.g., the Internet) and private Local Area Networks (LANs) and Wide Area Networks (WANs). The network devices coupled to network 68, such as network device 64, can comprise bridges, routers, computers, storage systems, etc. Network environment 60 further includes file server 66, which in addition to storing network programs and data, can also store UCI command files that may be remotely invoked to perform network management operations.

Operator console 62 can be implemented either as an ASCII terminal or as a workstation or other computer system. If implemented as a computer system, operator console 62 will have a software configuration including UCI 70 and an operating system (OS) 72. Network device 64 similarly has a software configuration including UCI 70 and an operating system (OS) 74, which is not necessarily the same as OS 72. As noted above, UCI 70 can be utilized as an interface to any network management platform (NMP), such as NMP 76 executed by network device 64, that supports the UCI information structures and definitions described herein.

The message transport protocol employed to convey UCI commands and responses between network devices depends upon the mode of UCI operation. In command line mode in which an operator is inputting UCI commands at operator console 62, the transport protocol utilized to convey UCI commands to a target network device and to communicate responses from the target network device to operator console 62 is preferably Telnet, a well-known protocol in the TCP/IP (Transmission Control Protocol/Internet Protocol) suite. If on the other hand, file mode UCI is utilized to convey one or more UCI commands between a file server and a target network device, Telnet File Transport Protocol (TFTP) is preferably utilized.

Figure 3:
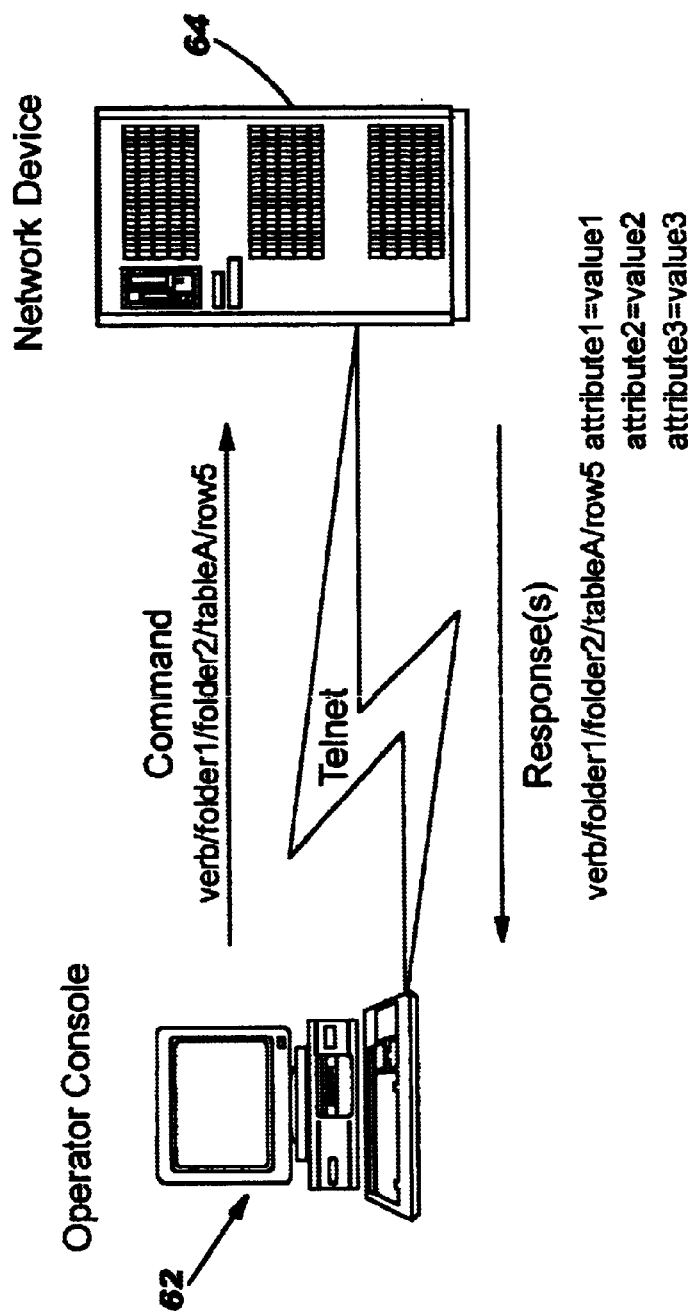
FIG. 3 illustrates an exemplary communication interchange between an operator console and a network device via Telnet.

With reference now to FIG. 3, an exemplary command line mode communication interchange between operator console 62 and network device 64 is illustrated. As indicated, the operator enters a command line at the prompt displayed at operator console 62 as follows:

verb (op. directive) /folder1/folder2/tableA/row5

The operator establishes a Telnet connection between operator console 62 and network device 64 via network 68, if such a connection is not already active, and transmits the UCI command to network device 64. In response to receipt of the UCI command, network device 64 executes the UCI command and provides a response echoing the original UCI command plus any additional parameters required or requested by the operational directive. Thus, as illustrated, the general format of the response(s) of network device 64 as displayed to the operator by operator console 62 is as follows:

verb /folder1/folder2/tableA/row5 attribute1=value1
  attribute2=value2
  attribute3=value3

As noted above, this response displayed at operator console 62 can conveniently be utilized to form a subsequent UCI command.

Figure 4:
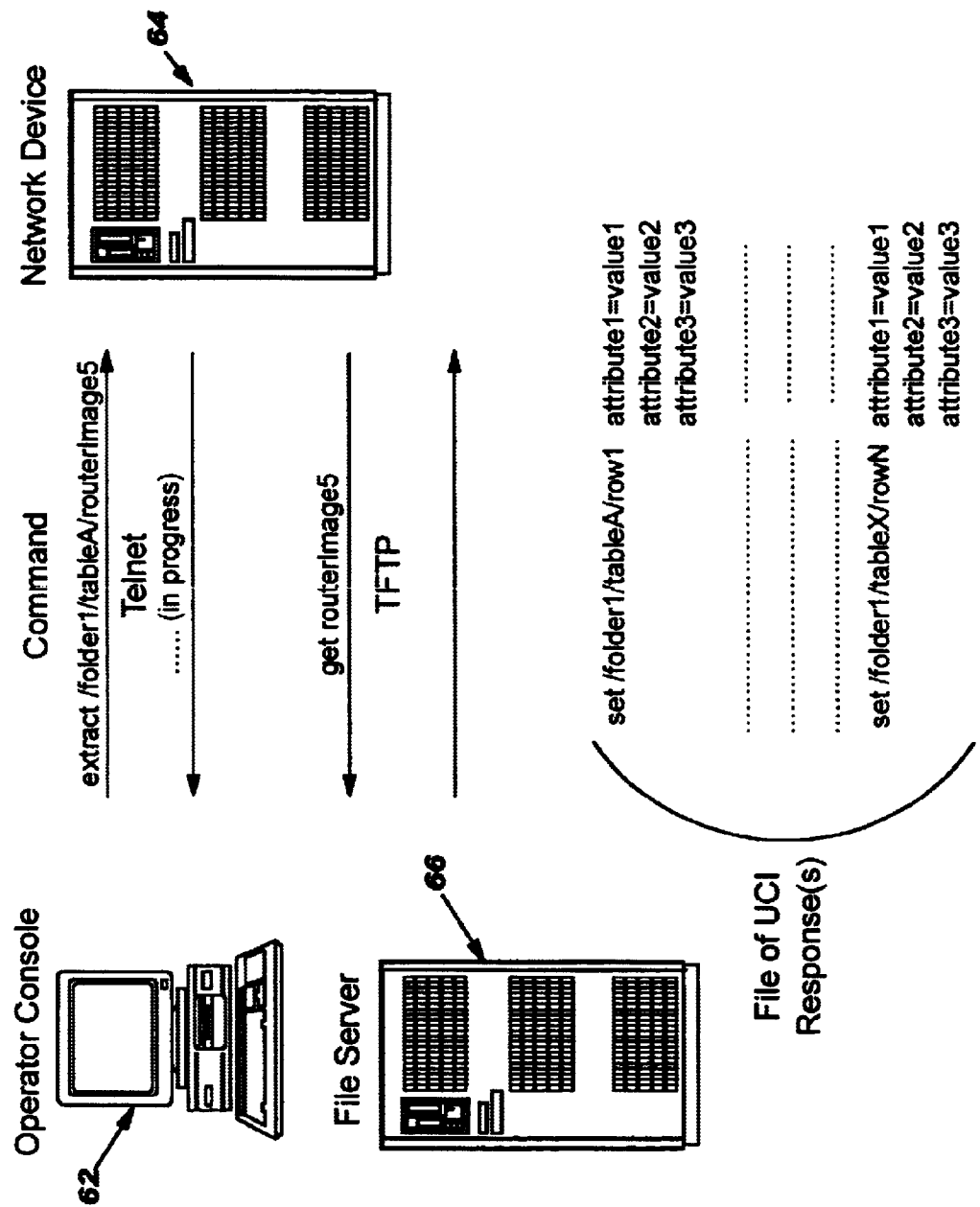
FIG. 4 depicts an exemplary communication interchange between an network device and a file server via TFTP (Telnet File Transfer Protocol) in which a file of UCI commands to be executed is transferred to the network device from a file server.

Referring now to FIG. 4, there is depicted an exemplary file mode communication interchange within network environment 60. As illustrated, an operator initiates the file mode communication interchange between network device 64 and file server 66 by entering an appropriate command, in this case an EXTRACT command, at the command line of operator console 62. The UCI EXTRACT command is then transmitted via Telnet to network device 64, which responds with a status message such as "in progress" while the UCI file specified by the command (i.e., routerimage5) is retrieved from file server 66, whose IP host name is specified in the EXTRACT command. As shown, in order to retrieve the specified UCI command file, network device 64 issues a TFTP GET command to file server 66.

File server 66 responds to the TFTP GET command by transmitting the UCI commands contained in routerimage5 to network device 64. As shown, these UCI commands may include, for example, UCI SET commands that set attribute values for the attributes contained in the rows of tables 1 through N. In response to receipt of these UCI commands via TFTP, network device 64 executes the UCI commands.

Figure 5:
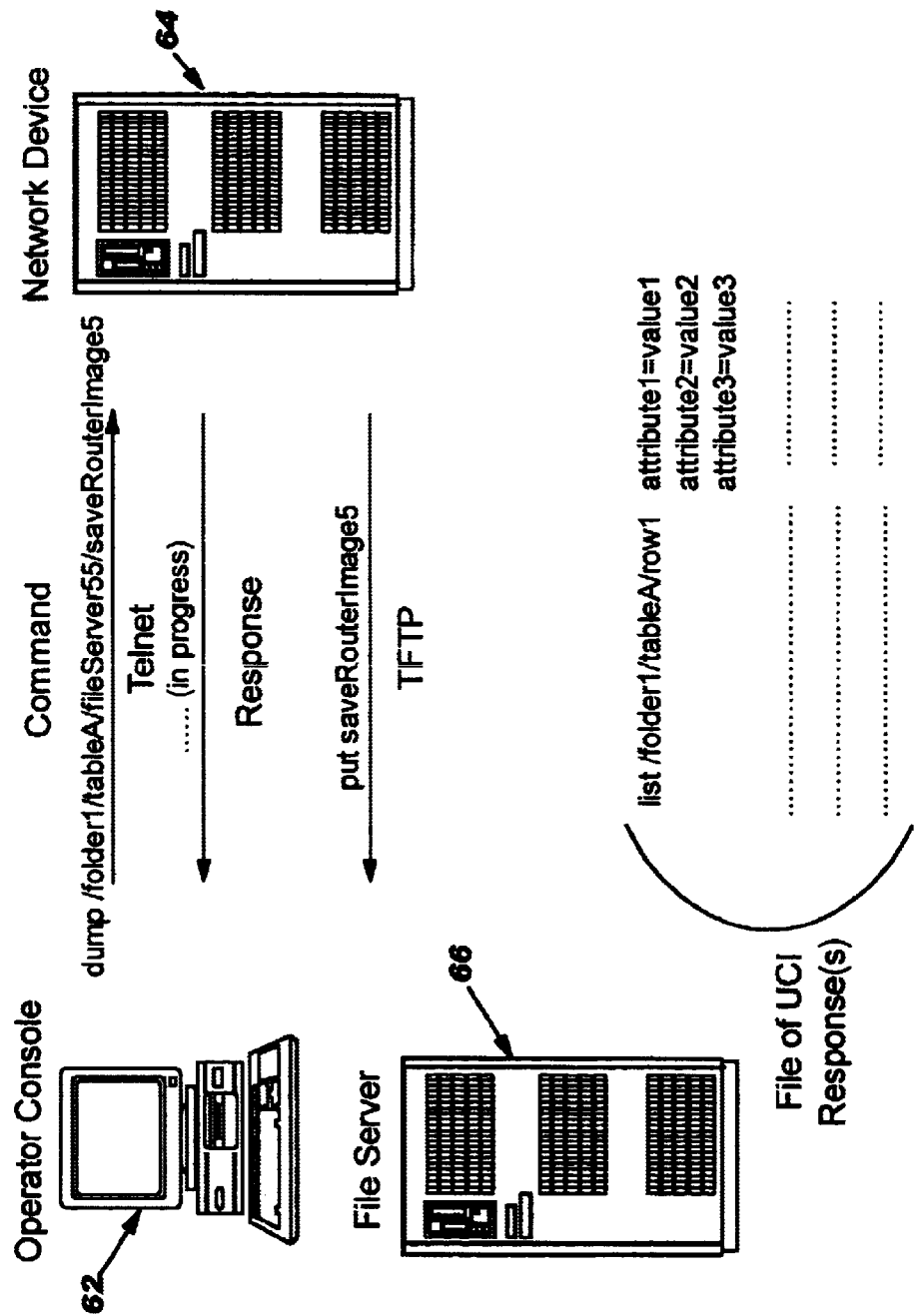
FIG. 5 illustrates an exemplary communication interchange between an network device and a file server via TFTP (Telnet File Transfer Protocol) in which a file of UCI commands is created and transferred to the file server.

As further shown in FIG. 5, file mode UCI commands can also be utilized to automatically create UCI command files. In the example given in FIG. 5, the operator enters a UCI DUMP command at operator console 62, which transmits the UCI DUMP command to network device 64 via Telnet. The UCI DUMP command specifies the name of the file into which the network device image is to be stored and the IP hostname of fileServer55. As before, network device 64 provides a status response to operator console 62 via Telnet such as "in progress." In addition, network device 64 issues a TFTP PUT command to file server 66, which is logically identified in the UCI DUMP command as fileServer55. The TFTP PUT command specifies the set of attribute values comprising the image of network device 64 and the name of the file into which the image is to be stored (i.e., saveRouterImage5), which is also provided to file server 66 in the UCI DUMP command. File server 66 accumulates the attribute values it receives from network device 64 into the file saveRouterImage5 as a series of UCI LIST commands. Thereafter, any text editor (e.g., Lotus WORDPRO®) can be utilized by the operator to display and/or edit the image of network device 64 stored at file server 66 in saveRouterImage5.

The UCI DUMP and EXTRACT commands also provide an audit trail feature that is maintained in UCI-specific audit trail tables 32 (see FIG. 1A) called dump and extract. These tables, which are persistent in the base UCI session and do not occur in child UCI sessions (discussed below), comprise a finite number of sequential entries that can each contain attribute value pairs (e.g., routerimage and IP hostname) logged from UCI DUMP or EXTRACT commands and a date and time stamp for the attribute value pair. In the event of a table overflow, the oldest entry in the table is overwritten.

The environment in which UCI commands are executed is called a session. The default behavior of a session is governed by an associated set of session environment variables 28. Table III below summarizes some of the UCI session environment variables.

| Environment Variable | Value range | Initial value for command line mode | Initial value for file mode |
|---|---|---|---|
| prompt | on/off | on | off |
| assist | on/off | on | off |
| op. dir. | any op. dir. | LIST | SET |
| op. context | config./realtime | config. | config. |
| parse-only mode | on/off | off | off |
| window scroll size | integer ≧ 0 | 24 | 0 |
| permissions | read/write/read-write | user-dependent | user-dependent |
| username | alphanumeric string | na | na |
| output volume | all/default | default | default |

The value of the prompt environmental variable determines whether the prompting provided by prompt mode facility 22 is enabled for the associated session. When prompting is enabled, the operational directive and scope are displayed at the beginning of each line and the cursor will be displayed at the end of the prompt to receive operator inputs. The operator is permitted to edit the prompt (e.g., by backspacing and retyping or entering a new scope with "../") to form a new operational directive and/or operational scope for the next UCI command.

The assistance provided to an operator when forming a UCI command can also be selectively enhanced by enabling the assist environmental variable. When assist is enabled, the prompt for the CREATE, SET and UPDATE operational directives will also include attribute names (shown in the example as column designations) and current value or default value (if no current value is available) for the attributes. If the attribute name has an enumerated syntax, that syntax is also displayed. For example, assuming prompting is disabled, editable CREATE and UPDATE commands can be displayed as follows, where UCI output is shown in bold type for clarity:

```
create /f1/f2/t2/rn1
column1[128]=256
column2=9.67.9.5
column3{ [true] | false }=false
column4{ 4M | [16M] | 100M=    !default chosen
column5[2056]=4096
update /f1/f2/t2/rn1
column1[256]=
column2[9.67.9.5]=
column3{ true | [false] }=true
column4{ 4M | [16M] | 100M=
column5[4096]=2056
```

Thus, the assist feature walks the operator through a table structure, prompting the operator with each attribute name and default value and querying the operator for an attribute value for all attributes in the table without the need to enter anything but Enter for the default or override value. The assist mode can also be configured to prompt the operator for only attribute values for which no default exists, such that the operator can configure a network device using a minimum number of inputs.

The environmental variables of a session further include an operational context that defines whether the operational directives of UCI commands issued in the session target runtime or configuration information hierarchies. As noted in Table III, by default the targets for operational directives in both command line and file mode are configuration rather than runtime MIBs.

UCI environmental variables also include a parse-only mode in which UCI verifies command syntax, but does not execute any UCI commands, whether valid or not. This feature is convenient in that an operator can test the correctness of a potential UCI command prior to committing data to an network device's information hierarchy.

Advantageously, UCI supports multiple concurrent sessions that can have either peer or parent-child relationships. Child sessions inherit the environmental variables established for the parent session, but modifications to a child's environmental variables do not affect the parent's environmental variables. The operator can toggle between active sessions and can enter and exit sessions independently. In order to facilitate the operator distinguishing between sessions, UCI can be configured to display UCI commands and responses for each session in a separate window. Alternatively, the various active sessions can be distinguished by different prompts, such as "+" or "+1" for the first parent, "++" for a child of the first parent, and "+2" for a peer of the first parent. The capability of multiple sessions is useful, for example, for obtaining or otherwise manipulating information that may be affected by or needed to formulate a next UCI command without having to delete a partially entered command or exit a task already in progress.

As has been described, the present invention introduces UCI, an improved command interface for network management platforms. UCI provides a simple readable and regular syntax for creating, reading, and updating data stored in a network device MIB as well as an efficient information structures for organizing network data. While extremely user friendly because of its many operator assistance features, UCI can also be utilized to manage and manipulate large volumes of network data in response to only a small amount of operator input.

Figure 6:
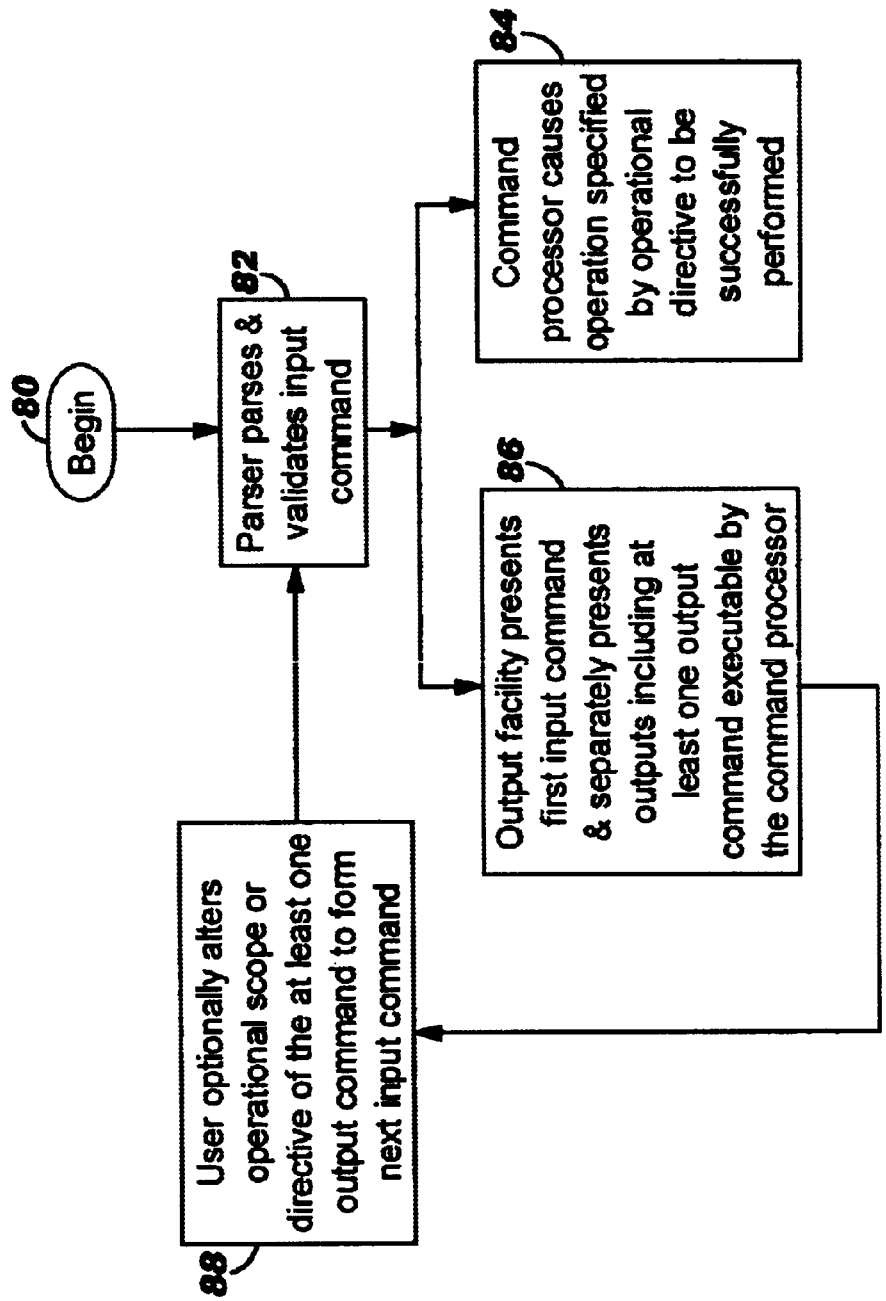
FIG. 6 is a flowchart depicting the processing of a command entered at a command line in accordance with the present invention.

FIG. 6 illustrates one embodiment of the method of the present invention. As illustrated, the process begins at block 80 in response to receipt by the parser of a first input command entered at a command line. The first input command has an operational directive specifying an operation to be performed and an operational scope specifying at least one object to which the operation is applied. Next, at block 82, in response to receipt of the first input command, the parser parses and validates the first input command. Parsing the command includes interpreting an operational scope of a command to be a same operational scope as an immediately preceding command unless either the operational scope or the directive is explicitly changed. In response to the validation, the operation specified by the operational directive of the first input command is successfully performed by the command processor, as illustrated at block 84. In addition, as depicted at block 86, the output facility presents the first input command and, separately from the first input command, one or more outputs for the operation in response to the operation being successfully performed. The one or more outputs include at least one executable output command presented at a command line that specifies an operation to be performed. This at least one output command can be submitted for validation as a second input command without entry of syntax of the second input command by a user. Alternatively, as shown at block 88, the user may optionally alter the operational scope or directive of the at least one output command prior to its submission as a second input command. Thereafter, the process returns to block 82.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A data processing system having an improved command line interface that reduces user input, comprising:

a processor and data storage in communication; and a command line interface residing in said data storage and executable by said processor, said command line interface including:

a parser that parses and validates a first input command entered at a command line, said first input command having an operational directive specifying an operation to be performed and a scope specifying at least one object to which the operation is applied;

a command processor that, responsive to said validation, causes an said operation specified by said operational directive of said first input command to be successfully performed; and an output facility that presents the first input command and that presents, separately from the first input command, one or more outputs of said operation responsive to said command processor causing said operation to be successfully performed, said one or more outputs including at least one output command executable by said command processor that specifies an operation to be performed, wherein the output facility presents the at least one output command executable by said command processor at a command line, such that said at least one output command can be submitted to said parser for validation as a second input command without entry of syntax of the second input command by a user;

wherein said parser enforces a syntax on commands entered at the command line, wherein said syntax includes an operational scope specifying a data set targeted by a command and a directive specifying an action to be performed on said operational scope, and wherein said parser interprets a subsequent command as having a same scope as an immediately previous command unless either said operational scope or said directive is explicitly changed.

2. The data processing system of claim 1, wherein said input command comprises an input network management command specifying an operation to be performed on particular network data.

3. The data processing system of claim 2, wherein said output command is an output network management command specifying a network management operation to be performed on particular network data, and wherein:

said output facility stores said output network management command in a command file; and said command processor, in response to receipt by said command line interface of a selected input, causes said output network management command to be retrieved from said command file and said operation specified by said output network management command to be performed.

4. The data processing system of claim 1, wherein said output command has a same operational directive and scope as said input command.

5. The data processing system of claim 1, and further comprising a network management platform for a communication network, wherein said network management platform resides in said data storage and is executable by said processor, said network management platform including said command line interface, wherein said parser parses and validates commands entered at a command line targeting a network device in said communication network, said network device having a plurality of attributes, wherein said parser enforces a syntax addressing said plurality of attributes as a tree-like hierarchy including at least two containers, and wherein each of said plurality of attributes is contained within a container and a particular attribute among said plurality of attributes is contained by multiple containers of the same type such that said particular attribute is addressable via a plurality of different paths.

6. The data processing system of claim 5, wherein said at least two containers includes a folder.

7. A program product providing a command line interface for a data processing system that reduces user input, said program product comprising:

a parser that parses and validates a first input command entered at a command line, said first input command having an operational directive specifying an operation to be performed and a scope specifying at least one object to which the operation is applied, wherein said parser enforces a syntax on commands entered at the command line, wherein said syntax includes an operational scope specifying a data set targeted by a command and a directive specifying an action to be performed on said operational scope, and wherein said parser interprets a subsequent command as having a same scope as an immediately previous command unless either said operational scope or said directive is explicitly changed;

a command processor that, responsive to said validation, causes said operation specified by said operational directive of said first input command to be successfully performed;

an output facility that presents the first input command that presents, separately from the first input command, one or more outputs of said operation responsive to said command processor causing said operation to be successfully performed, said one or more outputs including at least one output command executable by said command processor that specifies an operation to be performed, wherein the output facility presents the at least one output command executable by said command processor at a command line, such that said at least one output command can be submitted to said parser for validation as a second input command without entry of syntax of the second input command by a user; and a data processing system usable medium encoding said parser, said command processor, and said output facility.

8. The program product of claim 7, wherein said input command comprises an input network management command specifying an operation to be performed on particular network data.

9. The program product of claim 8, wherein said output command is an output network management command specifying a network management operation to be performed on particular network data, and wherein:

said output facility stores said output network management command in a command file; and said command processor, in response to receipt by said command line interface of a selected input, causes said output network management command to be retrieved from said command file and said operation specified by said output network management command to be performed.

10. The program product of claim 7, wherein said output command has a same operational directive and scope as said input command.

11. The program product of claim 7, said program product further comprising a network management platform including the command line interface, wherein the parser parses and validates commands entered at a command line targeting a network device in said communication network, said network device having a plurality of attributes, wherein said parser enforces a syntax addressing said plurality of attributes as a tree-like hierarchy including at least two containers, and wherein each of said plurality of attributes is contained within a container and a particular attribute among said plurality of attributes is contained by multiple containers of the same type such that said particular attribute is addressable via a plurality of different paths.

12. The program product of claim 11, wherein said at least two containers includes a folder.

13. A method of operating a command line interface of a data processing system that reduces user input said method comprising:

in response to receipt of a first input command entered at a command line, parsing and validating said first input command, said first input command having an operational directive specifying an operation to be performed and an operational scope specifying at least one object to which the operation is applied, wherein each command entered at said command line includes both an operational scope specifying a data set targeted by the command and a directive specifying an action to be performed on the operational scope, wherein parsing said command comprises interpreting an operational scope of a command to be a same operational scope as an immediately preceding command unless either said operational scope or said directive is explicitly changed;

in response to said validation, causing said operation specified by said operational directive of said first input command to be successfully performed; and presenting the first input command and, separately from the first input command, presenting one or more outputs for said operation in response to said operation being successfully performed, said one or more outputs including at least one executable output command specifying an operation to be performed, wherein said presenting comprises presenting said at least one executable output command at a command line, such that said at least one output command can be submitted for validation as a second input command without entry of syntax of the second input command by a user.

14. The method of claim 13, wherein parsing and validating said input command comprises parsing and validating an input network management command specifying a network management operation to be performed on particular network data.

15. The method of claim 14, wherein said output command is an output network management command specifying a network management operation to be performed on particular network data, said method further comprising:

storing said output network management command in a command file; and thereafter, in response to a selected input, retrieving said output network management command from said command file and performing said operation specified by said output network management command.

16. The method of claim 13, wherein said output command has a same operational directive and scope as said input command.

17. The method of operating a command line interface of claim 13, wherein said step of parsing and validating comprises:

parsing and validating a command entered at said command line that targets a network device in a communication network, said network device having a plurality of attributes, wherein parsing said command comprises enforcing a syntax addressing said plurality of attributes as a tree-like hierarchy including at least two containers, each of said plurality of attributes being contained within a container and a particular attribute among said plurality of attributes being contained by multiple containers of the same type such that said particular attribute is addressable via a plurality of different paths.

18. The method of claim 17, wherein said at least two containers includes a folder.

* * * * *